Aug. 5, 1924.
C. V. FURMAN ET AL
1,504,037
TOOL FOR REMOVING HEADLIGHT RIMS
Filed April 6, 1923
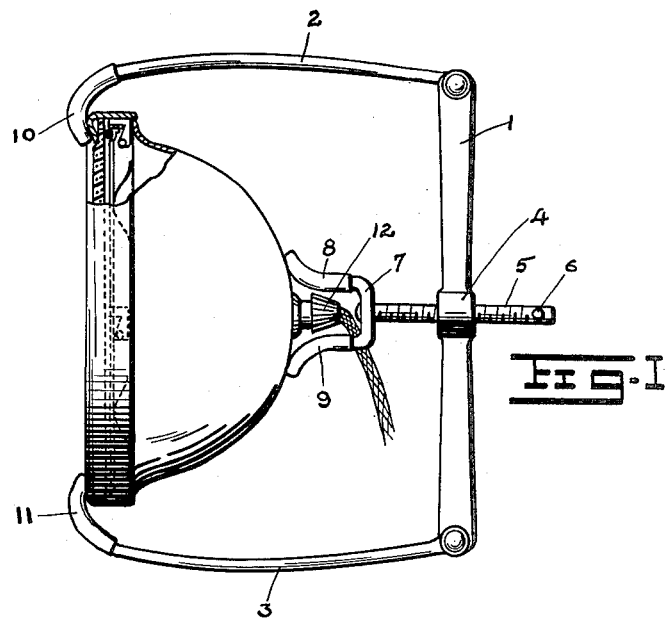
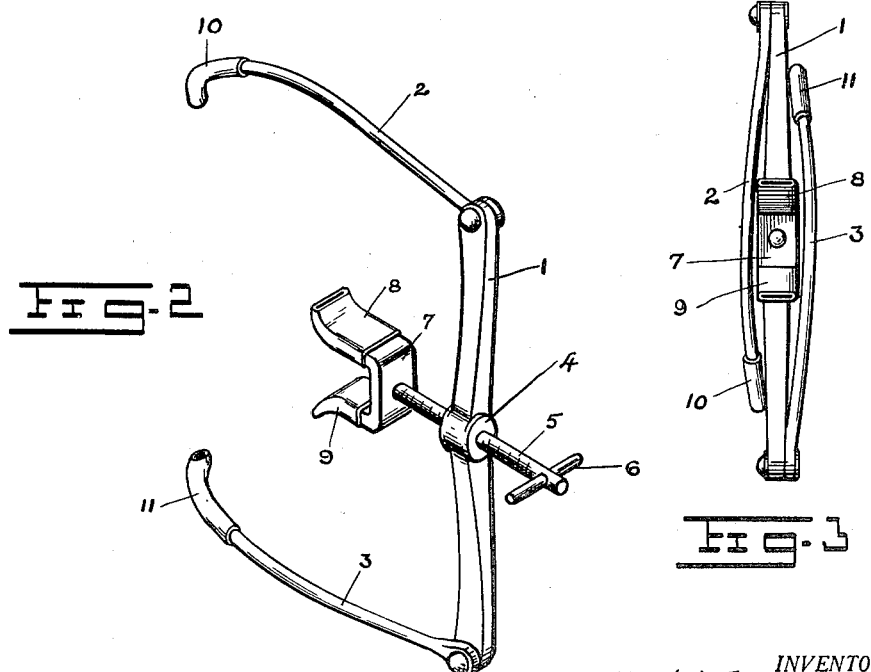
INVENTOR.
Claude V. Furman
Carl V. Youngs
BY Frank Keiper
ATTORNEY Patented Aug. 5, 1924.

1,504,037

UNITED STATES PATENT OFFICE.

CLAUDE V. FURMAN AND CARL V. YOUNGS, OF ROCHESTER, NEW YORK.

TOOL FOR REMOVING HEADLIGHT RIMS.

Application filed April 6, 1923. Serial No. 630,278.

*To all whom it may concern:*

Be it known that we, CLAUDE V. FURMAN and CARL V. YOUNGS, citizens of the United States, residing at Rochester, in the county of Monroe and State of New York, have invented certain new and useful Improvements in Tools for Removing Headlight Rims, of which the following is a specification.

The object of this invention is to provide a tool with which the rim of automobile headlights can be easily and quickly unlocked and removed from the headlight casing.

This and other objects of this invention will be fully illustrated in the drawing, described in the specification and pointed out in the claim at the end thereof.

In the accompanying drawing:

Figure 1 is a side elevation of a headlight with the tool attached thereto ready to unlock the rim of the headlight from the casing thereof.

Figure 2 is a detail perspective view of the tool.

Figure 3 is an end elevation of the tool as it will appear when the parts thereof are folded up ready to be placed in the tool kit.

In the several figures of the drawing, like reference numerals indicate like parts.

Headlights are usually provided with a casing with a rim separate therefrom but which is detachably locked thereto by means of sliding locking joints. Said locking joints require two movements to close them, one an endwise or telescoping movement that telescopes the rim over the casing, and the other is a sidewise or turning movement that locks the rim of the casing after it has been telescoped thereon. Springs are usually provided on the face of the casing so that when the rim is attached to it it must be forced against these springs. These springs hold the rim yieldingly in place in its locked position and prevent a rattling of the rim on the casing when the headlight vibrates. The rim is removed by forcing it toward the casing and turning it in the reverse direction. It is necessary to remove the rim to replace a lamp or change a lens or polish a reflector.

Rust frequently forms between the rim and the casing due to the presence of moisture either from rain or from washing the car or any other cause. This rust binds the rim to the headlight casing and makes it difficult to remove the rim therefrom so that great force has to be used to detach the rim and frequently tools are used that injure the parts or mar their finish.

The tool forming the subject matter of my present invention is adapted to loosen the rim from the casing no matter how badly it is rusted to it, and it also serves to compress the springs that are interposed between the rim and the casing so as to permit an easy turning of the rim on the casing to unlock it therefrom. It will do this without requiring much force on the part of the user of the tool and without injury to the parts of the headlight.

As illustrated in the drawing, this tool comprises the cross member 1 having the clamping arms 2 and 3 pivoted to the outer ends thereof. Of these arms the arm 2 is pivoted to one side of the cross member while the arm 3 is pivoted to the other side of the cross member 1. The ends of the cross member 1 are flattened to form good bearing surfaces for the pivoted ends of the arms 2 and 3. The middle portion is somewhat enlarged to form a boss 4 from which each side of the arm tapers to the end thereof for a purpose that will presently be described.

The boss 4 of the cross member 1 is threaded to receive the clamping screw 5. The outer end of this clamping screw has the pin 6 mounted thereon forming a handle with which the clamping screw is adapted to be rotated. The inner end of the clamping screw located between the clamping arms 2 and 3 has the yoke 7 swiveled to the end thereof. The sides of this yoke flare outwardly and have the cushions 8 and 9 attached thereto. These cushions are made of resilient material such as soft rubber, etc., so as to prevent marring of the headlight casing to which it is applied.

The outer ends of the clamping arms 2 and 3 are curved inwardly to form the hooks 10 and 11 thereof. These hooks are also padded by means of suitable cushions of rubber or other suitable material so as not to mar the rim of the headlight that is taken off by the tool.

The tool is applied to the headlight from which the rim is to be detached as illustrated in Figure 1; that is, the cross member 1 is placed behind the headlight casing and the clamping arms 2 and 3 are swung forwardly thereof until they engage the rim of the casing from two diametrically opposite points thereof. When the cushioned hook shaped ends 10 and 11 of the arms 2 and 3 engage the front of the rim, the clamping screw 5 is rotated by means of its handle 6 until the yoke 7 swivelled on the inner end thereof straddles the light socket 12 of the headlight and finally rests with its outwardly flaring cushioned ends against the headlight casing on two opposite sides of the light socket 2. A further rotation of the clamping screw then operates to pull the cross member 1 with its arms 2 and 3 rearwardly, the yoke 7 serving as a stationary base against which the inner end of the clamping screw braces itself while drawing the cross member 1 rearwardly. In drawing the cross member rearwardly as above pointed out the rim of the headlight casing to which the arms 2 and 3 are attached are drawn back with it. It is necessary to do this for but a short distance that is sufficient to break the rusty connection between the rim and the casing of the headlight. When this is done the rim can be freely turned on the casing while the tool is still applied thereto until the unlocking position of the rim is reached. The tool is then taken off and unhooked from the casing to allow the rim to be taken off from the casing.

The tool may also be used for the placing of the rim on the casing. In this case the rim is first held against the headlight casing while the arms 2 and 3 are hooked over it from the rear. The clamping screw 5 is then tightened up until the rim has been drawn back against the casing ready to be turned for locking it in place thereon as heretofore described.

Only one person is needed for the operation of the tool so that any adjustment of the headlight lens or a replacement of the headlight bulb can be readily and quickly done by any one using this tool.

The tapering ends of the cross member 1 are provided to allow the arms 2 and 3 with their hook shaped ends to swing against the side of the cross member for the purpose of folding up the tool to be placed in the tool kit. For this purpose the arms are slightly curved sideways as illustrated in Figure 3 so as to allow the arms to also swing past the sides of the yoke 7 when folding up the tool.

We claim:

In a tool for removing rims or headlights, the combination of a cross member, a pair of arms pivoted at the outer ends of said cross member, and adjustable clamping screw threaded into the middle of said cross member, a handle formed on one end of said clamping screw, a yoke swiveled on the other end of said clamping screw, said yoke having outwardly flaring sides, resilient cushions mounted on said outwardly flaring sides, said yoke being adapted to straddle the light socket of the headlight and form a base on the back of the headlight adapted to have the adjusting screw to brace itself against it, hooks formed on the ends of said arms, said hooks being adapted to project over the top of the rim of the headlight and down in front of it.

In testimony whereof we affix our signatures.

CLAUDE V. FURMAN.
CARL V. YOUNGS.